United States Patent [19]

Van Remortel et al.

[11] Patent Number: 5,136,502
[45] Date of Patent: Aug. 4, 1992

[54] SYSTEM FOR FUNDING, ANALYZING AND MANAGING HEALTH CARE LIABILITIES

[76] Inventors: Fred Van Remortel, 400 N. Union St., Alexandria, Va. 22314; Stanley H. Clow, Indian Hollow Rd., Mendham, N.J. 07945

[21] Appl. No.: 770,021

[22] Filed: Oct. 2, 1991

[51] Int. Cl.$^5$ .............................................. G06F 15/42
[52] U.S. Cl. ................................................ 364/413.01
[58] Field of Search ....................... 364/401, 408, 413.01

[56] References Cited

U.S. PATENT DOCUMENTS

| | | |
|---|---|---|
| 4,642,768 | 2/1987 | Roberts . |
| 4,648,037 | 3/1987 | Valentino . |
| 4,722,055 | 1/1988 | Roberts . |
| 4,750,121 | 6/1988 | Halley et al. . |
| 4,837,693 | 6/1989 | Schotz . |
| 4,839,804 | 6/1989 | Roberts et al. . |
| 4,933,842 | 6/1990 | Durbin et al. . |
| 4,969,094 | 11/1990 | Halley et al. . |

OTHER PUBLICATIONS

Young, "Two Strategies Plotted for Health," *The Journal of Commerce*, Jul. 27, 1987.
Bacon, "Benefits—Rule Migraine", *Nation's Business*, pp. 22-25, Oct., 1988.
Bhatia, "Prefunding Retiree Health Benefits: A Proper Nest Egg?", *CFO*, Jul. 1989.
"Corporate-Owned Life Insurance Set for Utility Retiree Claim Woes", *Utility Spotlight*, Jul. 10, 1987.
Freudenheim, "Company Expenses for Retirees Soar", New York Times, Sep. 9, 1988.
Gulotta, "The Liability Time Bomb is Ticking", *Chief Executive*, Jan./Feb. 1988.
"Insurance Consultant Address Unfunded Health Care Liabilities", *Insurance Advocate*, Jul. 11, 1987.
"Issue: Managing Retiree Medical Benefits", *Corporate Public Issues*, Jun. 1, 1988.
"Mass Mutual to Push Variable Insurance as Retiree Health-Care Savings Vehicle", Money Management Letter, Jun. 27, 1988.
Rees, "Post-retirement Employee Health Care Benefits Have Firms Struggling to Meet Mounting Costs", *Los Angeles Business Journal*, Apr. 18, 1988.
Roel, "Retirees Fight Cost Increases" *New York Newsday*, Sep. 8, 1989.
Rosenberg, "Defusing the Postretirement Time Bomb", *Institutional Investor*, May 1988.
Sloane, "Proposal Seeks to Aid Retiree Health Funds", *The New York Times*, Jun. 22, 1987.
Van Remortel "Retiree Health Benefit Liability Reaches the Crisis Point" *Pension World*, Aug. 1988.
Wall Street Journal Report, "Many Matters—Ticking Time Bomb" WCBS-TV 11 a.m., Feb. 19, 1989.
Williams, "Health Liability Funding", *Pensions & Investment Age*, Jan. 25, 1988.
Young, "Life Insurance Proposed to Fund Retiree Plans", *The Journal of Commerce*, Jun. 29, 1987.
Internal revenue Code, §4194A, (1988).

*Primary Examiner*—Gail O. Hayes
*Attorney, Agent, or Firm*—Dickstein, Shapiro & Morin

[57] ABSTRACT

The invention relates to a system for funding and managing retiree health care benefits. The system employs a VEBA trust which in turn purchases variable life insurance contracts on the lives of a selected group of employees covered by the VEBA trust. The premiums from the life insurance contracts are used as investments, the inside build-up of which are non-taxable under UBIT or AMT. The resulting death benefits are then placed into the trust and are used to pay for the actual health care cost. The funding organization is used in conjunction with a computer system that estimates tax contribution limits of the trust, forecasts the yearly liabilities and premiums to be purchased by the VEBA and estimates tax savings, earnings per share, and determines income sheet statements in accordance with FASB 106.

15 Claims, 2 Drawing Sheets

SYSTEM FOR FUNDING, ANALYZING AND MANAGING HEALTH CARE LIABILITIES

FIELD OF THE INVENTION

The invention relates to a health care benefits system which utilizes a funding system to fund present and future health care liabilities and includes the capability of projecting, investing, tracking and reporting on the performance of the funding system.

BACKGROUND OF THE INVENTION

A majority of large and medium sized corporations provide health care benefits for their retired employees. Up until the late 1970's employers treated retirement benefits as an alternative method of compensation. The retiree health care cost was an added feature of the corporation's pension benefits since many companies correctly assumed, at that time, that the actual cost would largely be borne by Medicare. With health care costs soaring (rising faster than the Consumer Price Index for 10 years in a row) coupled with increased life expectancies, early retirement and the consistent drop in the portion of costs covered by Medicare, that initial assumption of a margin between the covered costs and Medicare payments has virtually disappeared. In fact, the narrow margin has turned out to be an enormous expense.

An additional change has further compounded the financial burden for corporations. In the fall of 1990, the Financial Accounting Standards Board (FASB) promulgated accounting standard 106 reflecting FASB's belief that retiree health care is just another form of deferred compensation and should be reflected in corporate balance sheets and income statements similar to the way FASB treats pensions. In essence, FASB required that unfunded active health care costs be reported as corporate liabilities and that the accrued benefits be charged to corporate earnings. The impact of FASB 106 will create additional and sometimes enormous liabilities on corporate balance sheets and have a detrimental effect on corporate net worth.

To contend with looming liabilities and the impact of FASB 106, corporations recently began to attempt to reduce their health care obligations to a manageable level. Their efforts appear largely unsuccessful.

Some corporations proceeded to fund plans through tax-exempt trusts known as Voluntary Employee Beneficiary Association (VEBA) trusts under Section 501(c)(9) of the Federal Tax Code. Following the 1984 Tax Act, however, certain restrictions were placed on VEBAs including the limitation on tax deductible pay-ins. For example, inflation could no longer be taken into account for calculating funding levels and certain investment earnings on VEBAs were taxable. As a result, many corporations that previously used VEBAs as vehicles for funding post-retirement health care, halted, or severely curtailed, their contributions.

Another approach used was funding a 401(h) account as part of the employer's pension trust. The 401(h) account is a retiree health account placed within a pension trust. The 401(h) account, however, also has severe tax limitations. Companies are only permitted to funnel 25% of their contributions to the pension plan into the health care account. The 25% limitation is not sufficient to reduce a corporation's increasing liabilities.

Other solutions include re-designs of existing post-retirement plans to reduce expenses and decrease overall liabilities. A drawback with re-designs is that they often result in litigation or resistance by employee associations and/or unions.

A further option to fund health care liabilities is through Corporate-Owned Life Insurance (COLI) plans. COLI plans generally work as follows: a company buys life insurance on workers and retirees naming the corporation as beneficiary; the cash value of the policy then builds as an asset. Since COLI is life insurance, the interest on amounts borrowed from the life insurance plan (to offset the retirement cost) are tax-deductible. In addition, the actual build-up of cash in the life insurance policy also is not taxable.

COLI also has many drawbacks. Congress recently placed limits on the amount of interest that can be deducted from borrowing from the plan. In addition, only the cash value of the policy with the loans deducted are allowed to be reported on the balance sheets to offset the liability under FASB 106.

Beyond funding the overall health care liability, relatively little attention has been paid to systems for handling the retirement health care problem to minimize actuarial, management and accounting time and costs. Even more critically, no system has been developed to conform corporate accounting/reporting practice to the norms of FASB 106.

In fact, prior systems are solely directed either to reporting pension benefits or for providing actuarial assessments for insurance. Those systems have thus not integrated all phases of a retirement funding program. In sum, there does not appear to be a system available for forecasting, investing, tracking and reporting retirement health care funding program parameters in an efficient integrated system.

A substantial need, therefore, exists for resolving the funding shortfall for retiree health care costs and to reduce the balance sheet risk for corporations. A need also exists for a solution that also plans and manages the liability and asset values and reports the programs' results in compliance with FASB 106.

SUMMARY OF THE INVENTION

In view of the foregoing, there exists a need in the art for a system which enables corporations to effectively and efficiently fund retiree health care costs in order to minimize corporate tax exposure while providing the corporation with the analytical and management capabilities for controlling the funding program.

It is therefore a primary object of this invention to provide a computer system for managing a retiree funding program which analyzes retiree health care funding through a VEBA trust that invests in variable life insurance policies on selected employees and automatically provides corporations with reports related to the performance of the VEBA trust in accordance with the FASB standards generally, and standard 106 particularly.

It is another object of the invention to provide a retiree health cost computer system for achieving corporate tax advantages automatically by analyzing and determining maximum deductible contributions to the trust that qualify under the limitations imposed by the Internal Revenue Code. Additional tax advantages are achieved with the computer system of the invention by virtue of tax free investments for the trust.

It is another object of the invention to provide a retiree health cost computer system for projecting liabilities, qualified tax deductions and insurance premium values that are necessary to fund the present and future health care cost for the employer.

It is another object of the invention to provide a retiree health cost computer system for selecting a portion of the plurality of employees for insurance coverage. The selection criteria include the employee's age, the per capita premium value for that employee and pertinent state laws relating to insurable interest.

These and other objects of the invention are accomplished by a retiree health care benefit system that administers health care benefits for at least one employer on behalf of a plurality of employees in that plan who are to receive payments for their health care. The system includes a VEBA trust. The trust includes an employer contribution determining means for analyzing and computing at least one employer's contribution to the trust. In addition, a purchasing means is included for determining a premium value for the life insurance policies covering the lives of a portion of the plurality of employees and then procuring those life insurance policies on a portion of the employee's lives. The VEBA trust also employs a collecting means that collects death benefit proceeds of the purchased life insurance policies and a paying means for paying the health care benefits to those employees incurring health care costs. The life insurance company then manages the purchased life insurance policies through investing means which invests the life insurance premiums in at least one investment vehicle in order that the investment proceeds provide cash build-up for the purchased life insurance policies. An accounting means is also provided which determines cash based accounting and accrual based accounting evaluations of the performance of the health care benefit system.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF A PREFERRED EMBODIMENT

Figure 1:
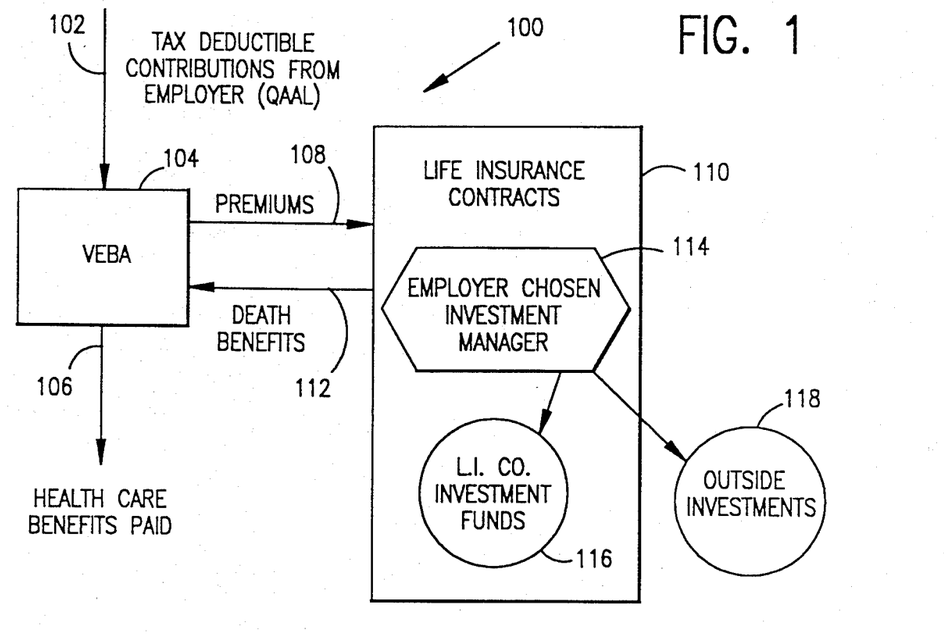
FIG. 1 is a block flow diagram showing the investment organization according to a preferred embodiment of the present invention.

Referring now in detail to the drawings wherein like parts are designated by like reference numerals throughout, there is illustrated in FIG. 1 a block-flow diagram of the investment organization 100 according to a preferred embodiment of the present invention. One of the purposes of the funding organization is to provide a qualified asset which mitigates balance sheet recognition of the retiree health care liability on a tax-advantaged basis, while also generating earnings sufficient to cover the cost of retiree health care benefits. The investment organization, as implemented in FIG. 1 also provides an ongoing administrative computer-based system to enable corporations to manage the liability efficiently with maximum flexibility and with minimum downside risk.

To accomplish this end, the funding implementation relies on two principal investment vehicles: a Voluntary Employee Benefit Association (VEBA) trust 104 and variable life insurance contracts 110 which act as the VEBA trust investment vehicles for funding the medical obligations. The VEBA trust and life insurance contracts are first described below.

The VEBA Trust

The VEBA trust 104 is a funding mechanism for employers to pay for various benefits to employees. The requirements for a VEBA are defined by Treasury Regulation 1.501(c)(9)-1 as a trust that allows employers to deduct their contributions to the VEBA. To meet the requirements of Section 1.501(c)(9)-1, a VEBA must have four components:

(i) It must be an employees organization;

(ii) Membership in the VEBA organization must be voluntary;

(iii) The VEBA organization must provide life, sickness, accident or other benefits to members and substantially all of the operations of the VEBA organization must be directed toward the provision of such benefits; and (iv) Net earnings cannot benefit the VEBA, private shareholders or individuals.

The types of benefits covered by the VEBA include health care benefits 106 that can be provided after the employee retires as long as the benefit also was available while the employee was working.

Otherwise, the benefit is considered "deferred compensation" subject to the rules of the Internal Revenue Code Section 404. Specifically, the contribution is treated under Section 404(a)(5) as being deferred compensation in which the employer is only entitled to a deduction when the benefits are paid. However, if the plan is a continuation of a past plan, or is part of a current plan for active employees, the payments are not considered deferred compensation, and are permissible.

The Internal Revenue Service does not set any maximum or minimum funding levels for the VEBA, although the maximum amount deductible for the VEBA is equal to the qualified cost, provided the total amount in the VEBA at the end of the taxable year does not exceed the qualified cost ("QAAL") 102 under Internal Revenue Code Section 419 for each year. The qualified cost 102 is determined by three factors: the qualified direct cost, the qualified asset account and after-tax income.

Qualified direct cost is the aggregate amount that would have been allowed as a deduction by a cash method employer for benefits provided during the year if the employer had provided the benefits directly on a current basis. For purposes of determining the qualified direct cost, a benefit is treated as provided when the paid benefit would be included in an employee s gross income (or would be includable but for an exclusion provided by the Internal Revenue Code). The qualified asset account "QAA" comprises the annual additions to be set aside for future medical payments incurred, but unpaid and includes claims incurred, but not yet reported, as well as claims which have been reported, but have not yet been paid. The future liability covers medical payments for persons already retired and for active employees. The QAA also includes an amount to fund a reserve for post-retirement medical benefits based on an actuarially determined level or a "safe harbor" estimate which is 35% of the qualified direct cost for the previous year.

The qualified direct cost and QAA are added together to derive the employer tax deduction (the qualified costs) 102 less the after-tax income of the fund, provided the total contributions to the VEBA do not result in the total amount in the VEBA, as of the end of the VEBA's taxable year, exceeding the QAAL.

One of the other tax issues of the VEBA is to minimize taxes on the trust's earnings. To do so, the after-tax income of the fund must be minimized, yet at the same time provide a tax free means for funding future liabilities. If the VEBA makes investments, it could also have income that would reduce its qualified cost. The VEBA income is potentially taxable on two bases: as unrelated business income as it applies to trusts (UBIT) or under alternative minimum tax (AMT) for corporations. Included in the UBIT as taxable income are earnings on VEBA assets that are held for post-retirement medical coverage.

To minimize the tax implications on the VEBA income and to maximize the contribution tax deduction, therefore, the income from the VEBA must be invested in vehicles that effectively do not produce taxable income. To accomplish this goal the contributions to the VEBA that meet that above-described "qualified cost" limit 102, are invested by the VEBA as premiums 108 in life insurance contracts 110. Life insurance is used since the increase in the invested asset value, otherwise known as "inside build up" in the life insurance policy, as well as any death benefits paid by the life insurance policy, are not taxable income and are thus neither included in UBIT or in the AMT. However, the paid-out death benefits received by the VEBA are applied to reduce the contribution deduction under IRC section 419.

Life Insurance Policies

The life insurance contracts 110 insure the lives of a cross-section of the company's current employee population which means that insurance policies will be purchased on the lives of a select number of employees in the relevant population. The purpose of this approach is that the actual life insurance proceeds, upon the death of a selected employee, will provide the necessary income to pay for the health care benefits of the entire employee population.

The insurance contract 110 comprises a variable rate policy which allows the premium amount and timing of the premium payment to be flexible. The account value can then be invested by an employer-chosen investment manager 114, in divisions of a separate account with variable returns on the investment in each account. Depending upon the particulars of the policy, the investment manager can invest, either directly in life insurance company investment funds 116 or in outside investment funds 118.

Values may be transferred among the divisions of the separate accounts subject to account rules. As a result, a single policy can be invested in one or more investment vehicles, and the return of these investments create the non-taxable "inside build-up" on the policy value. The value of the premium purchased by the VEBA is equal to the QAAL minus any paid-out death benefits.

The VEBA 104 will then be funded by the resulting death benefit 112 paid by the life insurance contracts 110. In the preferred embodiment there will be no borrowing against the cash value of the insurance policies, although it is contemplated that as an alternate embodiment, the invention includes borrowing as an option.

Operation of Investment Organization

Thus, in operation, the employer makes contributions to the VEBA 104 within the qualified cost limit 102. The amount of the allowable contribution is automatically determined for each year by means of the computer system that operates the investment organization 100. Details regarding how the computer system estimates the amount of contribution are set forth in FIG. 2. The computed contributions are then paid by the trust as premiums 102 covering particular representative employees. The premium face value, and which lives to insure are also determined by the computer system described in more detail in FIG. 2. The VEBA trust then purchases the life insurance policies. The purchased policies are variable life insurance policies 110, the "inside build-up" investments of which are managed by an employer-chosen fund manager 114. The resulting death benefits 112 are then paid to the trust. The trust then uses the benefits to pay for costs 106 for the covered employee. As a result, the employer's contribution to the VEBA 104 is tax deductible and both the inside build-up and the death benefits are neither treated as taxable under UBIT or under the corporate AMT.

The Computer System

Figure 2:
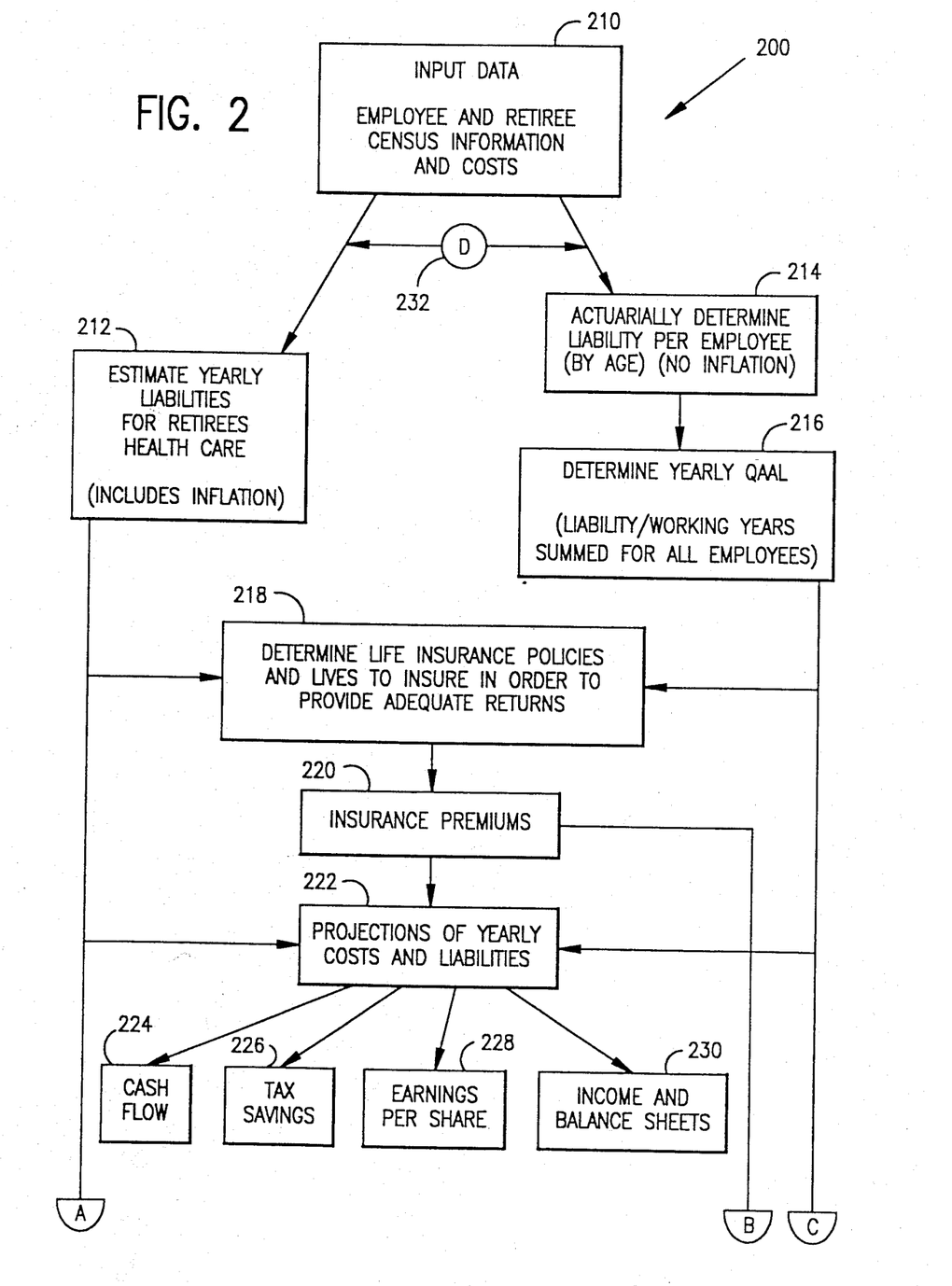
FIG. 2 is a block flow diagram of the analytical system for determining front-end parameters for the investment organization according to FIG. 1.

Referring now to FIG. 2, a flow chart 200 illustrates the front-end analytical system used by a computer system for determining liabilities, premiums and the qualified cost. The computer system operates the funding program shown in FIG. 1. The analytical system consists of computer hardware and software. The computer hardware comprises a personal microcomputer that has the capacity for rapidly developing value estimates based on the software. Although many types of computers may be used, the present invention contemplates a computer system using a 80-386 microprocessor and at least a 40 MB hard drive capacity and IMB of RAM.

The first step in the analytical evaluation is to form a basis from which annual per-capita liabilities and total corporate liabilities can be established. An actuarial valuation must be developed which encompasses a detailed description of the medical benefits provided to eligible retirees as well as the claim experiences for those recovered retirees. Detailed information is also needed about each retiree, each active employee and the financial results of the medical plan.

Actuarial data is obtained in the preferred embodiment, by means of a computer system, which through an interactive program, queries employees, actuaries, plan administrators and other key managers to create the necessary census and plan information to implement the invention.

The census-taking module 210 requires appropriate users to input a description of the medical benefits provided to eligible retirees. Included in that description are the following:
Summary of the groups covered;
Description of the eligibility requirements;
Duration of benefits and any lifetime maximums;
Provisions concerning family and spousal coverage;
Medical coordination information;
Employee or retiree contributions;

Recent plan revisions and effective dates of change.

The claims experiences are taken by the census in order to reflect, by year, for the two most recent calendar years, claims that have been filed. Claims experiences must be segregated by active and retired status. The following information should be furnished.

Claims experience separated by age group (preferably five-year periods and at least into pre and post 65 age groupings);

The number of retirees covered for each year in each age range;

The medical (non-dental) reimbursements for each age grouping;

Reimbursed claims separated by (a) employees or retirees, (b) spouses and (c) other dependents.

Claims experiences should be separated into claims before and after the date of change. Pooling arrangements also should be segregated and identified.

Information required for retirees and active employees include name, social security number or other identification, sex, date of birth, date of employment/retirement, plan coverage codes, location and spouse and/or dependent information. The financial data of the plan includes benefits disbursements, employee contributions and any premiums or other transactions with the insurance carrier.

The retiree and census information is then loaded into the computer system memory (not shown) in order to calculate the company's medical costs, both for the current period and for future periods.

Calculations are based upon the census data including the total number of retirees, the total number of active employees and the cost per retiree for the current retiree population. Other assumptions include the percentage of retirees with dependent coverage and the average working lifetime of each retiree. A base cost for the previous year's medical program is also required. The estimate for yearly liabilities depends on a percentage of the mortality assumption as well as a medical cost trend growth rate assumption, and a qualified cost interest rate. Other assumptions used in the calculations performed by the computer system include termination rates, morbidity tables, employee contributions, amortization periods, benefit payment timing, retiree costs by sex and age, medicare offsets, medicare inflation trends and discount rates.

The estimated yearly liabilities 212 are then calculated for the entire retiree population (adjusted by the group annuity mortality assumptions).

At the same time, a user may also actuarially determine liability per employee 214. To do so, the user first selects a plan and its data which is read into the computer system's memory.

To establish values for corporate and per capita data (212,214) the base and medical variable arrays are dimensioned using the previously described census data stored in the memory. Variables held in the memory are stored in newly created arrays. Other variables, such as default decrements, are read in from datafiles and are stored in those arrays. Based upon the supplied decrements and in conjunction with the entered census data from step 210 and step 232 (see discussion of FIG. 3) the average working lifetime is then calculated. The average lifetime variable is later used to estimate the qualified cost in step 216.

Also based upon the previously described assumption information stored in the arrays obtained from the census and the average calculated working lifetime of the employee, an assumption page is then printed providing the actuarial assumptions used in the per capita analysis. Table 1 produced below illustrates an example of those assumptions used in the per capita analysis 214 and for the company-wide liability analysis 212.

TABLE 1

Actuarial Liability System
Assumptions

| | | |
|---|---|---|
| Beginning year of study | | 1989 |
| Census projection basis | | closed |
| Number of male (or unisex) retirees | | 7,375 |
| Number of female retirees | | 1,478 |
| Percentage of retirees with dependent coverage | | 80 |
| Average working lifetime | | 11.69 years |
| Total 1989 retiree medical cost | | $21,366,034 |
| Percentage of mortality (1983 GAM) | Year 1 | 100% |
| | Year 2 | 100% |
| | Year 3 | 100% |
| | Year 4 | 100% |
| | Year 5 | 100% |
| | Year 6 and after | 100% |
| Medical cost present value rate | | 10.75% |
| Medical cost trend rate | Year 1 | 8% |
| | Year 2 | 15% |
| | Year 3 | 15% |
| | Year 4 | 12% |
| | Year 5 | 12% |
| | Year 6 | 12% |
| | Year 7 | 12% |
| | Year 8 | 9% |
| | Year 9 | 9% |
| | Year 10 | 9% |
| | Year 11 and after | 6% |
| QAAL interest rate | | 7.5% |
| Trend QAAL | | yes |
| Current retiree amortization period | | 7 years |
| Future retiree amortization period | | 11 years |
| Medical benefit payment timing | | mid-year |
| Years to illustrate | | 30 years |
| Domestic corporate tax rate | | 34% |

Based upon the census data, the census is then projected for the number of years selected (30 years) by applying the chosen decrements. The trended costs per age group and non-trended costs are then calculated for each year illustrated. The annual costs per age group are then determined using the entered interest rate for the qualified cost at step 216.

Step 218 involves determining the life insurance policies that are actually to be underwritten as well as those lives to insure in order to provide adequate returns for future liabilities.

Determination of lives insured is guided by two goals: whether the company needs cash flow or earnings. The lives to be insured will be directly affected by these goals, since the need for cash flow would entail insuring older employees (with a higher mortality rate) while the earnings goal would entail obtaining insurance policies on the younger lives. Selection criteria are also defined by other concerns such as the definition of "insurable interest" contained in the statutes of the pertinent states.

The actual face amounts for the insurance and the number and age of the employee used for the policy are then determined based upon the particular funding needs of the program. The face amount of each policy is dependent upon the number of lives insured, the initial cash value of the policy and the net assumed return on the inside cash buildup of the policy. The determination of insurance premiums is thereby equal to the initial surrender value divided by the number of lives insured.

It should be noted that the initial premium contribution includes a deduction for the initial expenses for issuing and retaining the insurance.

The estimated yearly liability data is then used in conjunction with certain insurance "inside buildup" presumptions to develop projections for the cost, on an annualized basis, as well as the future liabilities for retiree health care costs under the program at step 222. The costs and liabilities are first determined based upon current retiree and employee populations and future retiree populations adjusted by annual mortality rates (mortality assumption using the GAM 1983). The projections include the number of retirees projected over the 30-year period along with an assumption on the growth of spouse and/or other dependents numbers.

Yearly costs and liabilities are then determined using the number of retirees, the average remaining working lifetime of those employees, a percentage of mortality and the medical costs trend rate assumptions described in Table 1. Current and future costs are also broken down by sex and the marital status of employees.

An expected present value and an annual expected cost of the medical benefits are also provided based upon an assumed discount factor (see Table 1, medical cost present value rate) for the current and future projected retiree pool.

From the yearly projections 222, a cash flow analysis and projection 224 is provided. The cash flow indicates, by year, the annual retiree medical expense the gross insurance premium expense and the estimated death benefits received per year. The net cash premium expense for each year (gross insurance premium minus estimated death benefits received) is then provided. A gross cash outlay is evaluated (based upon the annual retiree medical expense and the cash premium value). The qualified cost is then added to provide an annual tax savings basis. In the present example the corporate tax rate assumption of 34% (see Table 1) is used to calculate the annual tax savings. Then a net after-tax cash position is determined by subtracting the annual tax savings from the gross cash outlay. As a result, an immediate management and accounting capability for projecting cash-flow effect in accordance with the FASB 106 accounting standards is developed.

The cash flow projections include an analysis of the revenue impact of pre-funding based upon an actuarial assumption for the life insurance cash build-up. The projections include an annual retiree medical expense, which is based on the first year actual expense, the medical cost trend rate assumption and the projected retiree/spouse-beneficiary population. The cash value premium increase is calculated based on the qualified cost projections, and the estimated build-up rate.

The cash flow projections further include a retiree health care liability offset evaluation. The evaluation compares the cumulative value of the VEBA trust for each respective year. The cumulative cash value for the VEBA is equal to the cash value premium increase in value for that year plus the insurance premium (pre-funding amount) plus the estimated death benefit received. The retiree health care liability is the expected present value of the total health care liability for all retirees.

The tax savings 226 are also analyzed on an annual basis and a comparison to the after tax annual retiree medical expense for a pay-as-you-go system is made (assuming a 34% corporate tax bracket).

Earnings per share are also evaluated and compared to the pay-as-you-go income statement effect on share earnings. The savings per share are based on the average shares outstanding at a given point in time. The value of the shares represents the savings between the net income (see discussion below) with the present funding system and the net income without the present system divided by the number of shares outstanding. The savings per share are presented on an annual basis for the 30-year term.

Income and balance sheets for the VEBA are also determined for each year of the program. Income and balance sheets 230 include a projection on revenues. The VEBA revenue, as previously discussed is determined by adding together the increase in cash value of the life insurance contracts, death benefits received and the premium amount paid by the trust. The insurance premium cost is also projected to the extent that it affects the amount of pre-funding for a given year and are also based upon last year's actual medical system's taking into account the expected inflationary impact and changes in the number of covered employees. The net income (revenue minus insurance premium and annual medical retiree expense) is then projected and any income taxes thereon are determined by the assumed corporate tax rate of 34%. A net income figure is then calculated and is divided by the number of outstanding shares to derive an earnings per-share valuation 228.

To determine the yearly qualified cost, as shown in Box 216, a calculation of the qualified cost present value and annual qualified cost is provided. The annual qualified cost calculation removes all inflationary aspects of the program and produces the qualified asset account limit at a present value of the qualified cost to the current year. Trend rates are evaluated in a manner similar to pension valuation rate assumptions.

The annual qualified cost limit is then determined. This limit is equal to the qualified cost present value divided by the average working lifetime assumption (Table 1) for both current and future retirement costs. Current medical cost, future qualified cost limits and death benefit income to the VEBA are then added together to provide a total qualified cost deduction for the corporation.

Figure 3:
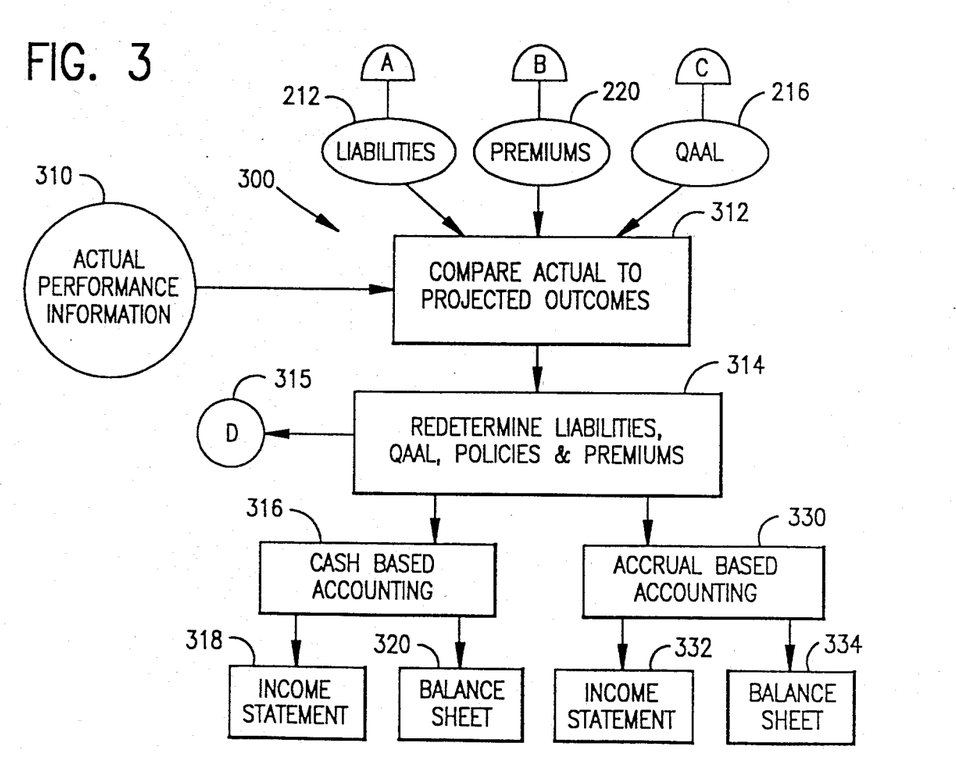
FIG. 3 is a block flow diagram of the analytical system for determining back-end performance based upon the front end control parameters of FIG. 2.

Referring now to FIG. 3, the annual activities for the funding system are evaluated in order to provide users with a readily understood account of the actual performance of the VEBA and to tie in that performance with current account standards promulgated by FASB, otherwise known as the back-end outcomes. Specifically, the back-end of the program compares the actual performance of the funding program in FIG. 2 with the forecasted performance outcomes i.e. (liabilities 212, the premiums 220 and the qualified cost 216) determined in the manner discussed above in (FIG. 2). The actual and projected outcomes are compared at step 312. The program then loops back at step 315 to the front-end process (shown in FIG. 2) at step 232 in order to modify the liabilities, life insurance policy face values and qualified cost limits projections based upon the actual performance. As such, projections for future years are updated annually by the previous year's performance data.

The back-end program then provides an accounting capability either on a cash basis 316 or on an accrual basis 330 in order to produce income statements and balance sheets (318,320 and 332,334) that comply with FASB 106.

For cash based accounting 316, the accounting information includes the current period expense when incurred.

These figures are then plugged into an income statement format 318 or a corporate balance sheet 320.

The accounting process at step 316 occurs as follows. First, the employer charges expenses for retiree benefits, as paid. The VEBA is then consolidated into the financial statements 318. As a result, the employer contribution to the VEBA 104 and the purchase of insurance by the trustee is accounted for as if the employer were buying the policies directly. VEBA assets are classified either as pre-paid post-retirement benefit costs or as restricted non-current assets on the employer's consolidated balance sheet 320.

Insurance premiums are accounted for less the change in cash surrender value for the year as an expense. Death benefits received are also recorded as income.

The pre-paid post-retirement benefit cost has different bases depending upon whether reporting relates to income taxes or financial purposes. For income tax purposes, the excess of contributions over the qualified cost limit is used as the basis. The basis for financial reporting purposes is the cash surrender value of the insurance policies.

With respect to accrual accounting, under FASB 106, the accounting information includes unrecognized transition obligation, the service cost, the interest cost, the transition obligation amortization and the benefit payments. The process is as follows.

First, the employer computes the accumulated post-retirement benefit obligation (APBO) for each year and the post-retirement benefit cost for that year. The cost is charged to expenses for the year and recorded as an accrued liability on the employer's balance sheet. Employer contributions to a trust qualify as planned assets, and thus reduce the accrual. Benefits paid out of planned assets have no direct impact on the employer's financial statement. Up to a maximum twenty (20) year amortization period can then be used on the transition obligation amortization to determine the amount in accordance with FASB 106.

The difference between the pre-paid post retirement benefit cost for income tax and financial reporting purposes would continue to be a temporary difference by which deferred taxes are recorded in the same manner as the cash based account method.

Although a preferred embodiment is specifically illustrated and described herein, it will be appreciated that modifications and variations of the present invention are covered by the above teachings and within the purview of the appended claims without departing from the spirit and intended scope of the invention.

What is claimed is:

1. A retiree group health care benefits computer system, that administers said group health care benefits for at least one employer, on behalf of a plurality of employees of said at least one employer, who are to receive payments for their health care, said computer system comprising:

accounting means for providing accounting evaluations of said health care benefits system;

a VEBA trust administering means, including:
employer contribution limit determining means for analyzing and computing said at least one employer's qualified asset account limit contribution to said VEBA trust, wherein said qualified asset account limit includes a qualified direct cost which is the aggregate amount that is allowable as a deduction if said health care benefits are paid on a current basis, a qualified asset account amount which involves the annual additions to be set aside for future medical payments that are incurred but are unpaid including claims incurred but not reported and claims reported but not paid, and an after-tax income of said VEBA trust;

selecting means for selecting certain individuals from said plurality of employees and for determining a policy value for each of a plurality of life insurance policies covering the lives of said selected certain individuals in order to fund a pooled liability of said group health care benefits of said plurality of employees, wherein total premium costs for said plurality of life insurance policies do not substantially exceed said qualified asset account limit contribution;

purchasing means for procuring said plurality of life insurance policies;

collecting means for collecting death benefit proceeds of said purchased plurality of life insurance policies; and paying means for paying said group health care benefits for said plurality of employees incurring health care costs from said collected death benefit proceeds from said individual life insurance policies for said certain individuals; and investment means for investing premiums of said procured life insurance policies in at least one of a plurality of investment vehicles, said investment vehicles being manages from within a life insurance company and/or from outside said life insurance company, in order that said at least one investment vehicle produces sufficient cash build up to cover said procured life insurance policies.

2. The retiree health care benefits computer system of claim 1, further comprising:
projecting means for providing projections of future costs for said plurality of employee's health care, qualified tax deductions, and insurance premium values necessary to fund present and future health care costs for said at least one employee.

3. The retiree health care benefits computer system according to claim 2, wherein said projecting means predicts a number of said plurality of employees, based upon employees census data provided to said computer system, who retire by sex and by spouse/dependents.

4. The health care benefits system according to claim 2, wherein said forecasting means predicts an overall health care cost per year for said plurality of employees.

5. The retiree health care benefits computer system of claim 1, wherein said selecting means includes:
employee selection means for selecting said certain individuals of said plurality of employees for life insurance coverage based upon each of said employee's age, states of residence and employment and a policy premium value for each of said plurality of life insurance policies.

6. The retiree health care benefits computer system according to claim 1, wherein said accounting means determines, coordinates and calculates information for income statements and balance sheets produced by said accounting means in accordance with FASB regulations pertaining to health care liability reporting standards.

7. A computer system for administering group health care benefits for at least one employer on behalf of a plurality of employees, said system comprising:

accounting means for analyzing performance of an investing means and costs associated with said group health care benefits;

reporting means for providing an accounting report of said performance of said health care benefits system;

determination means for calculating a qualified asset account limit which provides a limit amount for said at least one employer's contribution to a VEBA trust, wherein said qualified asset account limit includes a qualified direct cost which is the aggregate amount that is allowable as a deduction if said health care benefits are paid on a current basis, a qualified asset account amount which involves the annual additions to be set aside for future medical payments that are incurred but are unpaid including claims incurred but not reported and claims reported but not paid, and an after-tax income of said VEBA trust, said calculation involving adding said qualified asset account to said qualified direct cost and subtracting said after-tax income of said VEBA trust from the sum of said qualified direct cost and said qualified asset account;

valuation means for determining a policy value for each of at least one variable life insurance policy covering a life of at least one of said plurality of employees to fund a pooled liability of group health care benefits for said plurality of employees, such that a premium for said variable life insurance policy does not substantially exceed said qualified asset account limit;

purchasing means for purchasing said at least one variable life insurance policy in accordance with said at least one policy value;

investing means for investing a premium of said at least one variable life insurance policy in at least one investment vehicle; and collecting means for collecting death benefit proceeds and collecting earnings gains and losses from period to period of said at least one variable life insurance policy and for placing said collected death benefit proceeds in said VEBA trust and for providing said collected death benefit proceeds to those of said plurality of employees for said group health care expenses.

8. The computer system of claim 7, wherein said accounting means further comprises:

projecting means for providing projections of factors affecting said VEBA trust;

evaluating means for providing cash-based accounting and accrual based accounting evaluations of the performance of said health care benefits system.

9. The computer system of claim 8, where said accounting means provides said performance accounting in accordance with criteria complying with FASB 106.

10. A computerized retiree health care benefits system that administers group health care benefits on behalf of a plurality of employees, said computerized system comprising:

accounting means for providing accounting evaluations of the performance of said health care benefits system in accordance with FASB 106;

a VEBA trust, said trust including:

limit setting means for computing an employer's contribution limit to said VEBA trust which does not exceed a qualified asset account limit for a given year in order to provide a tax deduction for said employer, wherein said qualified asset account amount limit includes a qualified direct cost which is the aggregate amount that is allowable as a deduction if said health care benefits are paid on a current basis, a qualified asset account amount which involves the annual additions to be set aside for future medical payments that are incurred but are unpaid including claims incurred but not reported and claims reported but not paid, and an after-tax income of said VEBA trust, analyzing means for selecting a portion of said plurality of employees, and for determining policy values for variable life insurance policies covering the lives of said portion of said plurality of employees to fund a pooled liability of group health care benefits for said plurality of employees, procuring means for procuring variable life insurance policies covering said lives, collecting means for collecting death benefit proceeds of said purchased life insurance policies, and distributing means for paying said health care benefits from said collected death benefit proceeds and from said employer contributions to those of said plurality of employees incurring health care costs; and investing means for investing premiums of said purchased variable life insurance policies in at least one investment vehicle designated by an employer in order that said investment produces sufficient cash build up to cover said purchased life insurance policies.

11. The computer retiree health care benefits system of claim 10, wherein said contribution determining means further comprises:

adding means for adding the value of said qualified direct cost and the value of said qualified asset account; and subtracting means for subtracting the value of said after-tax income from said adding means in order to determine said qualified asset account limit.

12. A method for administering health care benefits for an employer on behalf of a plurality of employees using a computer system, said method comprising the steps of:

setting up and administering up a VEBA trust, comprising the steps of:

calculating for an employer of said plurality of employees an employer's contribution limit to said VEBA trust to not exceed a qualified asset account limit, wherein said qualified asset account limit includes a qualified direct cost which is the aggregate amount that is allowable as a deduction if said health care benefits are paid on a current basis, a qualified asset account amount which involves the annual additions to be set aside for future medical payments that are incurred but are unpaid including claims incurred but not reported and claims reported but not paid, and an after-tax income of said VEBA trust;

determining a policy value for each of a plurality of variable life insurance policies which respectively cover the life of a selected employee to fund a pooled liability of group health care benefits for said plurality of employees;

procuring said determined variable life insurance policies;

collecting death benefit proceeds from said variable life insurance policies; and distributing said health care benefits from said collected death benefit proceeds and employer contributions;

investing the premiums of said variable life insurance policies purchased by said VEBA trust in at least one investment vehicle; and accounting, on a cash/accrual basis, for the performance of said system in accordance with FASB 106.

13. The method for administering health care benefits of claim 12, further comprising the steps of:

projecting health care cost liabilities, qualified tax deductions and insurance premium values to fund present and future health care costs.

14. The method for administering the health care benefits of claim 12, further comprising the step of:

selecting a portion of said plurality of employees for said lives to be insured.

15. The method for administering health care benefits of claim 14, wherein said selecting step selects said employees based upon employee age, state and policy premium value.

* * * * *

UNITED STATES PATENT AND TRADEMARK OFFICE
CERTIFICATE OF CORRECTION

PATENT NO.  : 5,136,502

DATED       : August 4, 1992

INVENTOR(S) : Fred Van Remortel et al

Page 1 of 2

It is certified that error appears in the above-identified patent and that said Letters Patent is hereby corrected as shown below:

Col. 2, line 40, "programs" should read "programs' ".

Col. 6, line 23, "are then" second occurrence should be deleted.

Col. 7, line 60, "data files" should read "datafiles".

Col. 8, line 3, after "used" insert "in the per capita".

Col. 8, line 3 before "analysis" delete "the".

Col. 9, line 46, "a" should read "an".

Col. 10, line 41, after "future" insert "retirement costs. Current".

Col. 12, Claim 1, lines 40-51 should be deleted.

Col. 14, line, 24 insert "amount" before "which".

Col. 14 line 30, change "." to ",".

Col. 14, line 67, insert "up" before "and".

Signed and Sealed this

Twenty-second Day of September, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,136,502

DATED : August 4, 1992

INVENTOR(S) : Fred Van Remortel, et al

It is certified that error appears in the above-identified patent and that said Letters Patent is hereby corrected as shown below:

Col. 16, line 9, insert "for" before "the".

Signed and Sealed this

Twenty-second Day of September, 1992

Attest:

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 5,136,502
DATED : August 4, 1992
INVENTOR(S) : Fred Van Remortel and Stanley H. Clow It is certified that error appears in the above-indentified patent and that said Letters Patent is hereby corrected as shown below:

On title page, item [76]
    The inventors should be listed as follows:

Fred Van Remortel
        Stanley H. Clow
        Richard P. Sturtevant and
        Raymond B. Ryan Signed and Sealed this Thirty-first Day of December, 1996

*Attest:*

BRUCE LEHMAN

*Attesting Officer*      *Commissioner of Patents and Trademarks*